(12) United States Patent
Loraine (10) Patent No.: US 11,634,063 B2
(45) Date of Patent: Apr. 25, 2023

(54) ULTIMAT BINDER

(71) Applicant: Reginald Robert Loraine, Burlington (CA)

(72) Inventor: Reginald Robert Loraine, Burlington (CA)

(\*) Notice: Subject to any disclaimer, the term of this patent is extended or adjusted under 35 U.S.C. 154(b) by 806 days.

(21) Appl. No.: 16/707,215

(22) Filed: Dec. 9, 2019

(65) Prior Publication Data

US 2020/0262331 A1 Aug. 20, 2020

Related U.S. Application Data

(60) Provisional application No. 62/918,942, filed on Feb. 19, 2019.

(51) Int. Cl.
*F16G 11/12* (2006.01)
*B60P 7/08* (2006.01)

(52) U.S. Cl.
CPC .................. *B60P 7/0823* (2013.01)

(58) Field of Classification Search
CPC ........ F16B 7/06; B60P 7/0838; Y10T 403/29; Y10T 24/2164; Y10T 24/2175; Y10T 24/2177; F16G 11/12
See application file for complete search history.

(56) References Cited

U.S. PATENT DOCUMENTS

| 1,420,460 | A | * | 6/1922 | Sullivan | F16G 11/12 24/68 A |
| 2,403,828 | A | * | 7/1946 | Rawlins | F16G 11/12 411/513 |
| 3,719,377 | A | * | 3/1973 | Schultz | F16B 7/06 403/44 |
| 3,960,359 | A | * | 6/1976 | Svahn | F16B 7/06 254/231 |
| 4,122,560 | A | * | 10/1978 | Baker | E04H 4/143 24/71.1 |
| 4,131,264 | A | * | 12/1978 | Patterson, III | F16G 11/12 24/68 CT |
| 4,157,171 | A | * | 6/1979 | Hasselas | F16G 11/12 254/231 |
| 4,223,869 | A | * | 9/1980 | Patterson, III | F16G 11/12 254/231 |
| 4,567,627 | A | * | 2/1986 | Patterson, III | B63B 25/28 254/231 |
| 2008/0257099 | A1 | * | 10/2008 | Prat Terrades | F16C 1/22 74/502.6 |

\* cited by examiner

*Primary Examiner* — Robert Sandy
*Assistant Examiner* — Michael S Lee (57) ABSTRACT

There is provided a tensioning device for tensioning chains to secure loads on a transport vehicle. The tensioning device comprises first and second U-shaped yokes with parallel arms and an open end for coupling to fitments. The first yoke bottom has a threaded hole, while the second yoke bottom has an unthreaded hole. A threaded bolt rotatably extends through the unthreaded hole and engageably extends through the threaded hole, coupling the first and second yokes together. A limiter with a limiter leg is secured to the first yoke at the open end. The leg limits rotation of a fitment relative to the first yoke. The tensioning device includes a drive assembly having a universal type joint releasably coupleable with the threaded bolt, and an extension bar extending therefrom. Actuating the extension bar of the drive assembly rotates the threaded bolt, moving the first yoke relative to the second yoke.

15 Claims, 5 Drawing Sheets

ULTIMAT BINDER

FIELD OF INVENTION

This invention relates generally to chain binders and, in particular, to a chain binders for use in the transportation industry, to secure cargo in position during transportation.

BACKGROUND

A chain binder is a device, used in the transportation industry, to tension chains passing over, around or through a load to secure it in position while being transported. The binder is installed between two points on the chain, between the chain and anchor point, and/or directly to the object being secured.

There are a number of binder types conventionally used for tensioning and lashing devices such as chains, cables, and straps, that secure loads being transported by trucks, ships, aircraft or rail. Most of these binders have inherent operating safety problems since they require substantial physical and repetitive effort, and/or require the operator to be on the deck of the vehicle or in other awkward positions while they are being installed or tensioned.

Lever type binders have little lengthwise adjustment and require the operator to apply excessive physical effort to close the binder and this can result in physical injury. The handles have a tendency to spring back, injuring the operator or nearby personnel, especially if an extension bar is being used on the lever handle to close it. Also, operation of the binder can over-stress and damage the lashings due to the excessive forces applied. It is now common for transportation companies and their customers to ban lever binder use on their vehicles or their premises. Lever binders can spring open if not properly fully closed, thus loosening the lashing during transport and now, laws specifically require the handles to be secure in position.

Double screw ratchet binders require the operator to ratchet a handle while applying a considerable force to the handle to achieve proper lashing tension. Injury to the user's shoulders, arms, wrists and back associated with this operation is common, especially when a significant number of the binders are in use, operated repetitively, and where access to the binder is awkward, due its position or orientation.

Power operated binders are now available, however, they are generally ratchet-style binders with a gearbox in place of the ratchet handle or in addition to the handle. A power unit, at the center of the binder, drives the binders through the gearing mounted in the middle of a rotating tube, which screws on to threaded eye bolts, one at either end, thus drawing the eye bolts and hooks together. The truck driver must reach into the center, and usually at a right angle, to engage the power driver to the gearing of this type of binder. The threaded tube with the gear housing tends to rotate when power is applied to the binder. This rotation requires the operator to apply a force to counteract rotational torque and this is very difficult for the truck driver while standing on the ground and reaching into the middle of the binder.

Current lever, ratchet and power binders use chain links to connect the hooks to the ends of the binder and the operator must gasp the hook to orient and engage it with the chain. In many cases the operator will not have an adequate reach to engage the hook while standing beside the vehicle and will elect, if practicable, to install and tension the binder from a location on the deck, The operator is often in an unstable position at the edge of the vehicle while tensioning these binders. Also, while walking on the truck deck, he is exposed to tripping hazards such as binders, lashing and cribbing that is already in place or lying on the deck, or the cargo itself. In numerous cases truck drivers have fallen from the truck deck to the ground and been seriously injured.

Thus, there is a need for a binder that can reduce physical hazards when used relative to current binders and that can facilitate the safe efficient installation, tensioning of a chain, and securing of a cargo with minimal effort.

SUMMARY

In one embodiment, the present disclosure provides a tensioning device for tensioning chains to secure loads on a transport vehicle, the tensioning device comprising: a first and second U-shaped yoke each comprising two parallel arms, the arms being joined at one end by a member forming a bottom member of the U, and the arms are open at an other end, the parallel arms each have a hole positioned proximate the open end of each arm, the holes dimensioned to accept a pin passing through both holes, the bottom member of the first U-shaped yoke having a threaded hole extending therethrough on a center line of the first yoke, the bottom member of the second U-shaped yoke having an unthreaded hole; a threaded bolt rotatably extending through the unthreaded hole in the bottom member of the second yoke and engageably extending through the threaded hole in the bottom member of the first yoke, the threaded bolt engaging with threads in the threaded hole in the first yoke and coupling the second U-shaped yoke to the first U-shaped yoke; a first fitment for coupling to a chain, the first fitment pivotably coupled to the first U-shaped yoke with a first clevis pin extending through the holes in the arms of the first U-shaped yoke; and a second fitment pivotably coupled to the second U-shaped yoke with a second clevis pin, a rotation limiter with a limiter leg, the limiter being secured to one of or between the parallel arms of the first U-shaped yoke at the open end, the leg extending to limit rotation of the first fitment relative to the first U-shaped yoke; a drive assembly comprising a universal type joint releasably coupleable with a head of the threaded bolt to the socket, and an extension bar extending from the universal type joint; wherein actuating the extension bar of the drive assembly rotates the threaded bolt, which moves the first U-shaped yoke away or towards the second U-shaped yoke.

In some examples, the first fitment is a first hook for hooking a chain, the first hook pivotably coupled to the first U-shaped yoke with the first clevis pin extending through the holes in the arms of the first U-shaped yoke; and the second fitment is a second hook pivotably coupled to the second U-shaped yoke.

In some examples, the tensioning device further comprises a swivel assembly pivotably coupled to the second U-shaped yoke with the second clevis pin extending through the holes in the arms of the second U-shaped yoke; the second hook being pivotably coupled to the swivel assembly with a third clevis pin.

In some examples, the swivel assembly comprises: a swivel yoke having a pair of short arms connected by a bottom member at one end, the bottom member of the swivel York having another hole extending therethrough; a swivel fixture having one end of which is a tang drilled in the center to receive the third clevis pin therethrough and configured to allow the second hook to pivot around the third clevis pin, and an opposite end being a threaded member dimensioned to pass through the other hole in the bottom member of the swivel yoke; a swivel nut; wherein, the threaded end of the swivel fixture extends through the bottom member of the swivel yoke, engages the swivel nut positioned between the short arms of the swivel yoke and allows the swivel fixture and the second hook pinned to the tang to rotate within the swivel yoke.

In some examples, the extension bar is a ratchet-type extension bar, and the universal type joint is a gimbal or wobble type joint, and the socket is a drive socket compatible with the head of the bolt.

In some examples, the tensioning device further comprises an external power driver, a ratchet handle, or crank operatively coupled to the extension bar, the external power driver, ratchet handle, or crank configured to transfer a rotational force through the drive assembly, which rotates the threaded bolt to which it is engaged.

In some examples, the extension bar has a length such that the external power driver, ratchet handle, or crank is positioned at a distance from the bolt head.

In some examples, the drive assembly comprises a socket that is compatible with the head of the threaded bolt, the socket being releasably engagable between the head of the threaded bolt and the universal type joint.

In some examples, the threaded bolt has a socket head that is compatible with the wobble or universal joint.

In some examples, the limiter leg is positioned under the arm of the first U-shaped yoke, the limiter leg directed toward the centerline of the first yoke, extending past both the first yoke arm and a portion of the first hook, the limiter leg thereby restricting rotation of the first hook around the first clevis pin.

In some examples, the tensioning device further comprises a second rotation limiter secured to the other arm of the first U-shaped yoke.

In some examples, the tensioning device of further comprises a threaded washer or nut secured between the arms of the first U-shaped yoke, against the bottom member, on the center line of the first U-shaped yoke, to provide the threaded portion of the first yoke.

In some examples, the tensioning device of further comprises a rectangular washer secured between the arms of the first U-shaped yoke in the bottom member of the first yoke.

In some examples, the first and or second fitments are engageable with cables, nets, straps and or anchor points pivotably coupled to the first U-shaped yoke, the second U-shaped yoke or the swivel tang with clevis pins.

In some examples, the universal joint is a the gimbal style joint and the tensioning device further comprises a socket head bolt that directly engages with the gimbal style joint, and a compressible, resilient disk mounted securely on a neck of the gimbal style joint against the body of the gimbal style joint between the body and the protrusion.

DESCRIPTION

Binders are usually manufactured to comply with specifications laid down for specific uses by government, industrial associations and other users, such as Departments of Transport, the American Association of Railways. These specifications set out requirements such as Working Load Limits, Breaking Strength, lashing type and sizes (example—5/16 grade 7 chain), etc. and therefore, the dimensions, thread type, bolt style, thread length, materials used, method of manufacture, etc. are predicated by these requirements.

Turning to FIGS. 1 to 6, the tensioning device of the present disclosure generally comprises two opposing first and second yokes 1 and 2, connected by a fully threaded bolt 3. A hook 7 and a rotation limiter 21 are attached to the open end of first yoke 1 and a swivel assembly 5 and another hook 7 is connected to the end of second yoke 2.

Figure 4:
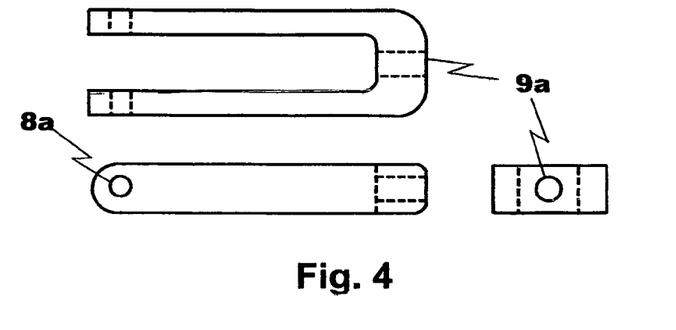
FIG. 4 is an illustration of multiple views of a main yoke in isolation.
Figure 5:
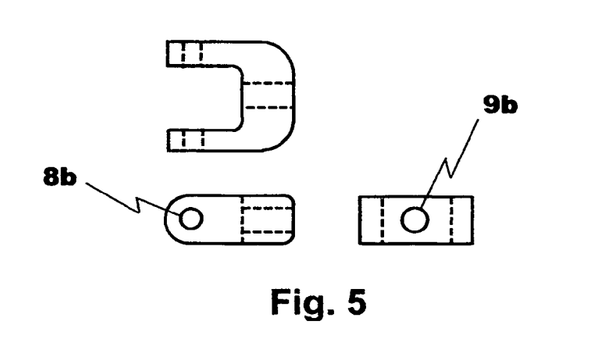
FIG. 5 is an illustration of multiple view of a swivel yoke in isolation.
Figure 6:
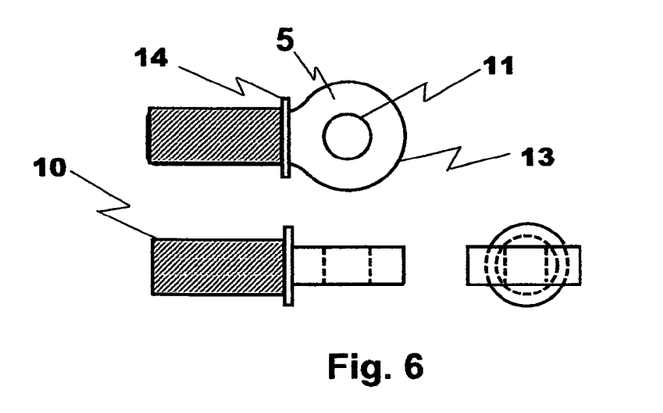
FIG. 6 is an illustration of multiple view of a swivel fitting in isolation.
Figure 7:
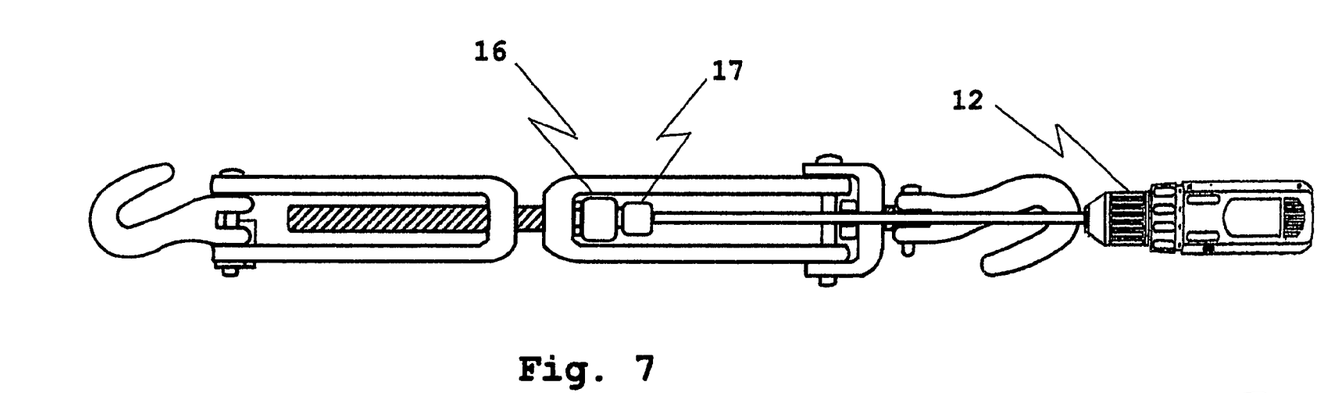
FIG. 7 is a plan view of the tensioning device of FIG. 1 in use with a power source.
Figure 8:
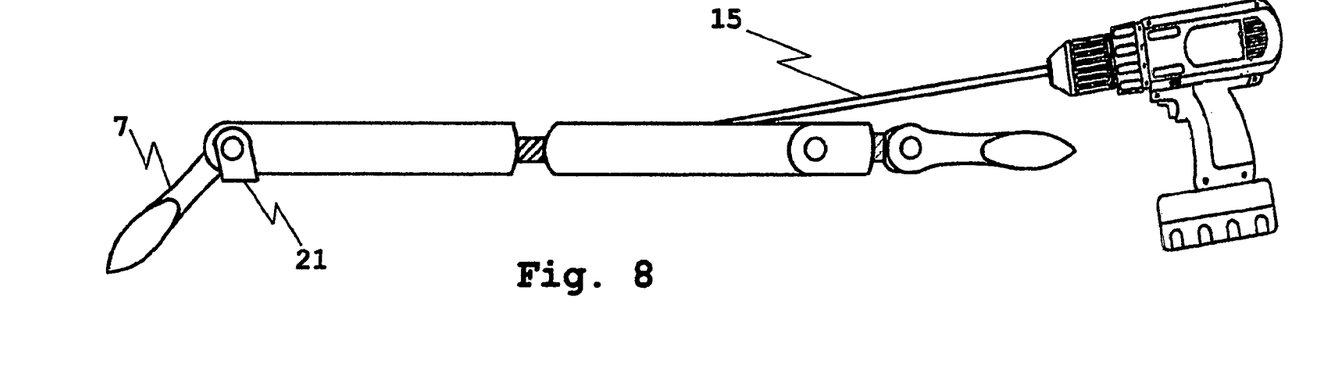
FIG. 8 is a side view of FIG. 7.
Figure 9:
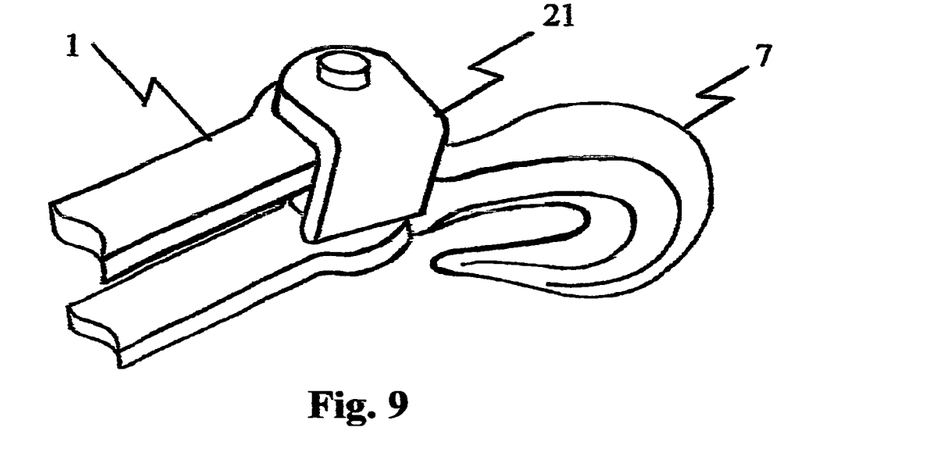
FIG. 9 is a lower perspective view of a hook rotation limiter in isolation.

First yoke 1 is a U shaped component, comprising two parallel arms, spaced equally apart, joined at one end by a member forming the bottom of the U, and open at the other end (see FIG. 4). A hole 9a on the center line of yoke 1, extending through the bottom member, is threaded for engagement with bolt 3. Two symmetrical holes 8a extend through the ends of the arms, at the open end of yoke 1, and are dimensioned to accept a clevis pin 18. Clevis pin 18 also passes through clevis holes of in hook 7, which is located between the arms of yoke 1. The length of the arms of yoke 1 are of sufficient length to allow bolt 3 to be extend between the arms of yoke 1 while also not contacting clevis pin 18. If hole 9a in the bottom of yoke 1 insufficient to provide adequate thread engagement with bolt 3, an appropriate nut or threaded washer may be installed in the bottom of yoke 1, between the arms, to provide the required threads. For example, a rectangular washer in the bottom of yoke 1 can be used under the nut to assist in transferring forces from bolt 3 to the yoke arms. The distance between the arms is greater than the diameter of bolt 3 and is also sufficiently wide to allow hook 7 to fit between the arms.

Figure 1:
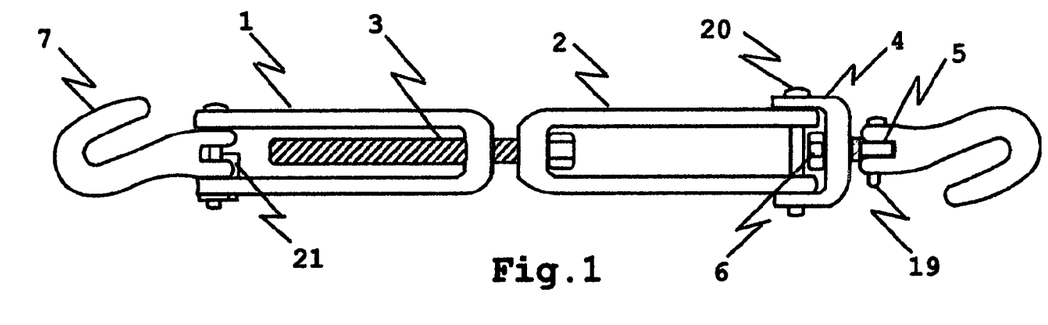
FIG. 1 is a plan view of a tensioning device according to an example embodiment of the present disclosure.
Figure 2:
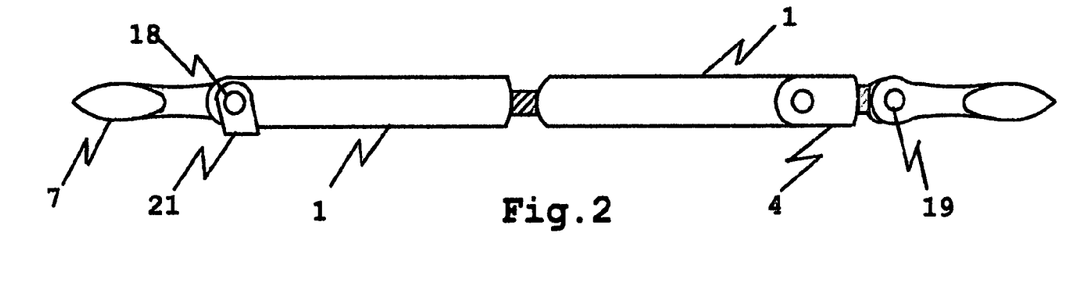
FIG. 2 is a side view of the tensioning device of FIG. 1.
Figure 3:
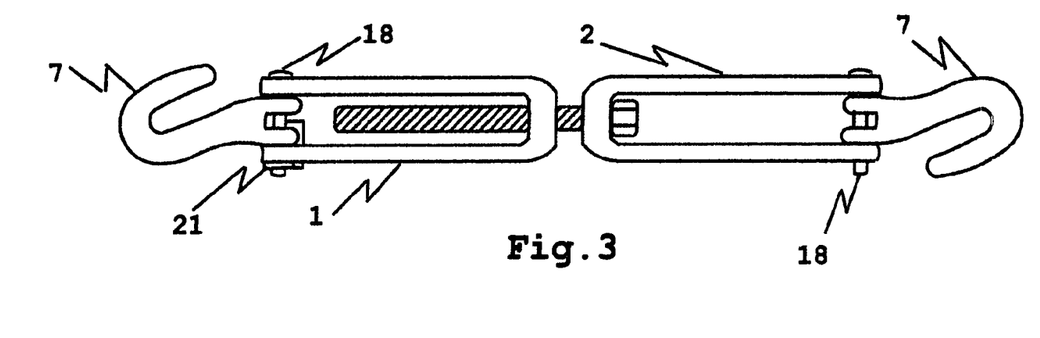
FIG. 3 is a plane view of a tensioning device according to another example embodiment of the present disclosure.

Second yoke 2 is also a U shaped component, similar to yoke 1 with hole 9a extending through the bottom member. In this case, hole 9a in the bottom member of yoke 2 is slightly larger than the diameter of bolt 3 and is not threaded. This allows bolt 3 to pass through second yoke 2 without engaging with hole 9a in yoke 2. The surface of yoke 2 where a head of bolt 3 bears against yoke 2 must be made to properly seat the bolt head without binding when rotated. A washer can be used between the bolt head and the bottom of yoke 2 to reduce friction and torque that may be required to rotate bolt 3 and distribute forces from bolt 3 into the arms of yoke 2. The two holes 8a at the open end of the arms of yoke 2 accept another clevis pin 18. In FIGS. 1 and 2, this clevis pin 18 also passes through clevis holes in swivel yoke 4. In FIG. 3, this clevis pin 18 also passes through hook 7 between the yoke arms when swivel yoke 4 is not in use. The distance between the arms of yoke 2 must be greater than a universal joint 17 and a socket 16 (described further below) to allow them to pass between the arms of yoke 2 and engage with bolt 3. This distance must also be sufficiently wide to allow hook 7 to fit between the arms when swivel yoke 4 is not in use.

A fully threaded bolt 3 passes through hole 9*a* in the bottom of yoke 2, engages with hole 9*a* in the bottom of yoke 1. When rotated, bolt 3 reduces the distance between yoke 1 and 2 and thereby reduces the distance between the two attached hooks 7, thus tensioning the chain to which they are engaged. Bolt 3 must be of sufficient length to remain engaged with yoke 1 when the tensioning device is open and also be of sufficient length to eliminate the slack in the chain and tension the chain when bolt 3 is rotated. The head style, diameter, thread type, and grade of bolt 3 may be varied depending on the specifications to be meet. If a socket head bolt is used, the gimbal or wobble joint (described below) may be engaged directly without socket 16 being required. Bolt 3 may also comprise of a threaded rod with a nut secured to one end.

Swivel yoke 4 (see FIG. 5), is U shaped similar to yoke 2, with a hole 9*b* in the bottom member of swivel yoke 4 that is slightly larger than a threaded shaft 10 of a swivel fitting 5 (discussed below) through which threaded shaft 10 passes. Clevis pin holes 8*b* are positioned at the open end of swivel yoke 4 arms to accept a clevis pin 20 that secures swivel yoke 4 to second yoke 2. The arms of swivel yoke 4 can be configured to be secured between or outside of the arms of yoke 2. The arms of swivel yoke 4 are of sufficiently length to ensure that swivel fitting 5 and nut 6 do not interfere with clevis pin 20. A rectangular washer can be used between nut 6 and swivel yoke 4, to distribute the forces from swivel fitting 5 and the nut to the arms of swivel yoke 4.

Swivel fitting 5 (see FIG. 6) comprises one end in which is a semicircular disc shaped protrusion 13 with a hole 11 in the center of disc shaped protrusion 13. The other end includes threaded shaft 10, which passes through hole 9*b* in swivel yoke 4. Threaded shaft 10 has a sufficient length to fully engage nut 6, which is locked to the threads, while also allowing swivel fitting 5 to rotate in hole 9*b*. The protruding portion 13 may be separated from threaded portion 10 by a washer or a washer shaped ridge 14, which acts as a bearing surface against the bottom of swivel yoke 4. Hole 11 in the center of protrusion 13 is dimensioned to accept a hook clevis pin 19, which pins hook 7 to protrusion 13 of swivel fitting 5 and allows hook 7 to rotate around the end of protrusion 13 and the centerline of the tensioning device.

Swivel nut 6 functions to engage with threaded shaft 10 of swivel fitting 5 sufficiently to fully engage the nut threads and is locked to it with sufficient thread left to allow swivel fitting 5 to freely rotate in swivel yoke 4 hole 9*b*.

Protrusion 13 on swivel fitting 5 may be a semicircular disk having central hole 11 to accept hook clevis pin 19, thereby attaching hook 7 to fitting swivel 5, and to allow hook 7 to rotate around hook clevis pin 19.

Washer 14 is an optional washer that may be disk shaped. Washer 14 is shown positioned between threaded shaft 10 and protrusion 13, which may bear against the bottom of swivel yoke 4.

Hooks 7 are example fitments. One hook 7 is attached to swivel fitting 5 with clevis pin 19, through hole 11 in protrusion 13. Another hook 7 is attached to yoke 1 with clevis pin 18 through holes 8*a* at the open end of the yoke arms that engage the chains to be tensioned.

Holes 8*a*, 8*b* in the open end of the arms of first and second yokes 1, 2 and swivel yoke 4 are the holes through which clevis pins 18 and 20, respectively, pin hooks 7 and swivel yoke 4 to first and second yokes 1 and 2.

Hole 9*a* in the bottom member of first yoke 1 is threaded to engage bolt 3. Hole 9*a* in the bottom member of second yoke 2 and hole 9*b* in the bottom of swivel yoke 4 are larger in diameter than bolt 3 and threaded shaft 10 of swivel fitting 5. They pass through and freely rotates in holes 9*a*, 9*b*.

Threaded shaft 10 of swivel fitting 5 is long enough to ensure full engagement of the threads of nut 6, to which it is locked, and still allow swivel fitting 5 to rotate in hole 9*b*.

Hole 11 is the hole in the swivel fitting protrusion 13 through which hook clevis pin 19 passes to attach a hook 7 to the fitting 5.

Turning now to FIGS. 7-11, the present tensioning device may further include a drive assembly for actuating the device. The drive assembly may include a power driver 12, an extension bar 15, universal joint 17, and optionally socket 16.

Power driver 12 is used to rotate bolt 3 via extension bar 15, universal joint 17 and socket 16. Power driver 12 is shown to be a power tool. However, it may be replaced with a crank style handle (speed wrench) or socket wrench handle.

Extension bar 15 may be a socket wrench type extension bar that functions to join power driver 12 to universal joint 17. The length of extension bar 15 may vary to accommodate the needs of the operation.

Socket 16 may be a wrench style socket positioned at the end of the drive assembly. Socket 16 engages with the head of bolt 3. If bolt 3 is a socket head bolt that can engage directly with the universal joint 17, socket 16 may not be required.

Universal joint 17, may be a gimbal, wobble or universal type style joint between extension bar 15 and socket 16. It permits the centerline of socket 16 to be aligned with the head of bolt 3, engage with bolt 3 and transmit the rotational force from power driver 12 and extension bar 15 to bolt 3. With the head of bolt 3 situated being between the arms of yoke 2 on the centerline of the tensioning device, direct access of the drive assembly along the centerline is restricted by hook 7 and the swivel assembly on the end of second yoke 2. The drive assembly may, thus, be offset at an angle to the centerline of first and second yokes 1, 2 by universal joint 17 to permit socket 16 to come into contact with the head of bolt 3.

Rotation limiter 21 (see FIG. 9) of the present embodiment is an L shaped hook rotation limiter. Rotation limiter 21 has a leg or angle-shaped section with a hole in the center. The hole has the same diameter as clevis pin 18. Rotation limiter 21 is installed with clevis pin 18 on the outside of first yoke 1 or inside the clevis arms of hook 7. Limiter 21 has another leg that passes over one of the arms of first yoke 1 and over one of the clevis arms of hook 7. When hook 7 rotates toward limiter 21, its rotation is stopped at a predetermined position (see FIG. 8 for example) when both hook 7 and the arm of first yoke 1 is in contact limiter 21. Thus, hook 7 with first yoke 1 is held by limiter 21 and facilitates engagement with a securement chain 22 (see FIG. 10, for example). The operator may grasp second yoke 2 and utilize first yoke 1 and bolt 3 as an extension, making engagement of hook 7 at a point significantly beyond the user's reach (see FIG. 11 for example). Limiter 21 can be incorporated as an integral component of first yoke 1.

The tensioning device applies tension to chain 22 by the drive assembly when power driver 12 positioned near the end of second yoke 2 rotates bolt 3 (see FIGS. 7 and 8), using the drive assembly components 15, 16 and 17 to engage with bolt 3. Bolt 3, aligned along the centerline and passing through yoke 2, is rotated into the threaded hole 9*a* in yoke 1. The bolt is rotated by a power driver 12 or manually with a crank or handle located near the end of yoke 2, through a combination of extension 15 of appropriate dimension, universal joint 17 and socket 16 which engages bolt 3. Thus, yokes 1, 2 and hooks 7 attached to them are drawn together. Slack in the chain is reduced and the chain is tensioned (see FIG. 11). Rotating bolt 3 in the reverse direction removes tension in the chain, slackens it, and facilitates removal of the tensioning device from chain 22.

Swivel yoke 4 that is installed between yoke 2 and hook 7 at the closed end of yoke 2 enables yoke 2 to rotate relative to hook 7. This facilitates access to the bolt head when it is restricted by the rotational orientation of yoke 2.

Hook rotation limiter 21 holds hook 7 on first yoke 1 in a position that facilitates engagement with chain 22 when the operator holds yoke 2 and extends yoke 1 and the attached hook 7 to engage it to chain 22. In the present embodiment, the rotation of hook 7 around the clevis pin may be restricted to approximately 65 to 85 degrees from the centerline of the tensioning device. Hook 7 thus being oriented to readily engage the chain, an operator holding the first yoke and using the balance of the binder as an extension, can install the binder while standing safely beside the transporting vehicle.

The location and position of the power driver near the end of yoke 2, and its distance from the bolt head is determined by the length of extension bar 15 selected by the operator.

The tensioning device may be installed and operated by the operator while the operator is standing on the ground beside the deck of the truck, railcar, pallet or container. This helps to remove the operator from potential tripping and falling hazards encountered when on the deck of the vehicle. Rotation limiter 21 holds hook 7 on the end of first yoke 1 in a position that facilitates engagement with chain 22 without requiring the user to physically holding hook 7 in the correct orientation. This allows the operator to grasp second yoke 2 and, using the bolt 3 and yoke 1 as an extension, engage hook 7 with chain 22 (see FIG. 10) at a point beyond his normal reach.

Figure 10:
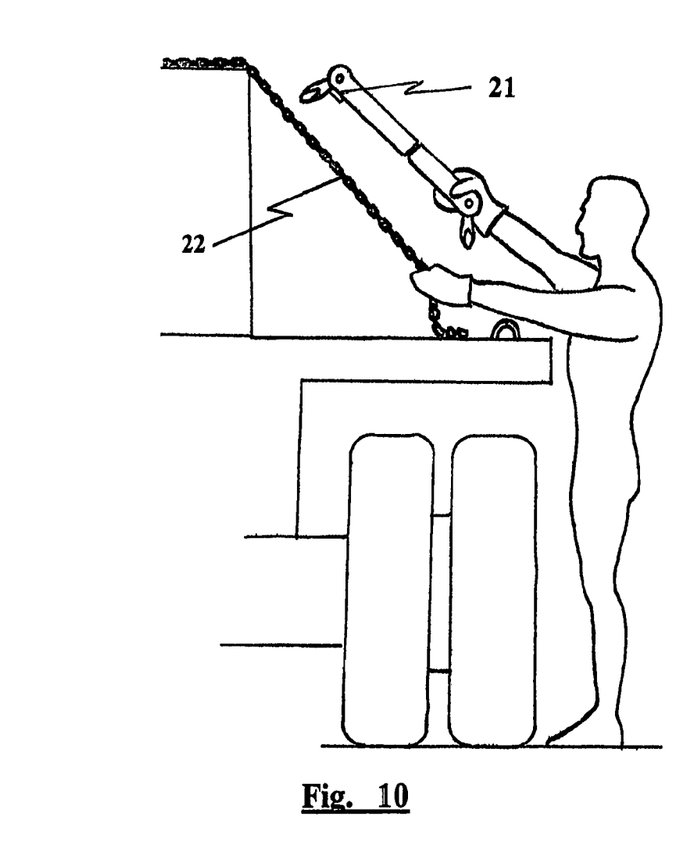
FIG. 10 is a side view of a user coupled the tensioning device of FIG. 1 to a chain on a truck.
Figure 11:
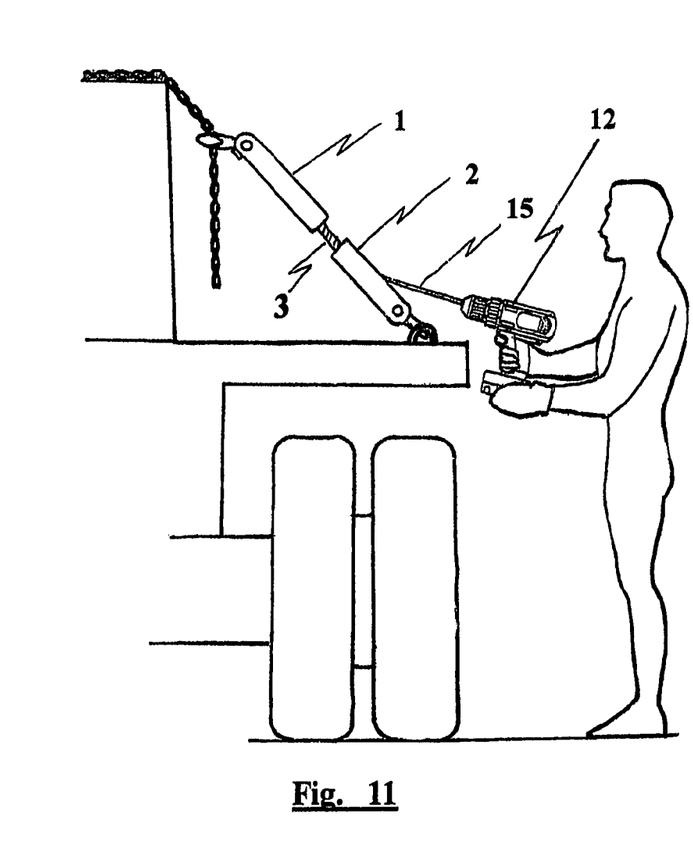
FIG. 11 is a side view of the user of FIG. 10 using the tensioning device with the power source as shown in FIG. 8.

Muscle and tendon injuries associated with the tensioning operation of the present binders may be reduced, since the operator can more often, be located in a comfortable, convenient, and less physically demanding position, as depicted in FIGS. 10 and 11, i.e. at the side of the deck. Injuries may be avoided where the position of power driver 12 may be adjusted by selecting a different length for extension bar 15.

The magnitude of repetitive physical exertion related to the operation of present ratchet binders may be reduced, since the binders single screw requires one half the torque required to generate the same tension in the chain as does a binders with two screws. The efficiency and speed of the tensioning operation may be improved since bolt 13 is coupled directly to power driver 12, whereas the rotation rate of the central body of the present power binders is reduced by the associated gearing.

The present tensioning device may be collapsed for storage after use, or opened when preparing for use by moving yoke 1 and yoke 2 together or apart with the portion of bolt 3 moving between yoke 1 and 2, passing through hole 9a in the bottom of yoke 2, into and out of yoke 2. Present ratchet and powered binders must have the eye bolts at both ends manually rotated, ratcheted or power rotated to collapse or open them.

The present tensioning device is lighter and more easily stored due to the absence of a handle, gear box or chain links on the ends of current binders. The present tensioning device is also relatively uniform along its length, with moving parts inside the binder yokes. This helps to eliminate damage to cargo by ratchet handles, gear boxes and projections associated with current lever, ratchet and power binders.

While specific embodiments of the tensioning device are described an illustrated, variations are possible.

Where the operator has easy access to bolt 3, without yoke 2 being rotated, swivel yoke 4, fitting 5 and nut 6 may not be installed as part of the tensioning device and hook 7 can be affixed directly to yoke 2 using clevis pin 18.

Yoke 1 can be manufactured from tubular material, with one end having a threaded portion to accept bolt 3 and which performs the same functions as described above.

Yoke 2 can be made with the distance between the arms wide enough to allow a powered or hand ratchet and socket to engage the bolt head directly without using the universal joint or extension.

The swivel assembly consisting of swivel yoke 4, swivel fitting 5, and nut 6, can be substituted with any appropriate components that allows hook 7 to swivel around the centerline of the tensioning device.

The present tensioning device may be used to tension of different types of lashing rather than hooks 7. In some application, the lashing may include cables, straps, netting or an anchoring devices can be accommodated by exchanging the present hooks pinned to the end of the yokes or the swivel, to effectors compatible with the lashing or anchors being used.

Where a power driver is not available a crank or ratchet handle can be used to rotate the drive assembly and the bolt 3.

The description of the preferred embodiments above serves only as an illustration of the spirit of the invention. It will be understood by those skilled in the art that various changes or supplements or adoption of similar fashions may be made without departing from the spirit of the scope of the invention as defined by the appended claims.

What is claimed is:

1. A tensioning device for tensioning chains to secure loads on a transport vehicle, the tensioning device comprising:
    first and second U-shaped yokes each comprising two parallel arms, the arms being joined at one end by a bottom member, the arms are open at an other end, the parallel arms each have a hole positioned proximate the open end of each arm, the holes dimensioned to accept a pin passing through both holes, the bottom member of the first U-shaped yoke having a threaded hole extending therethrough on a center line of the first U-shaped yoke, the bottom member of the second U-shaped yoke having an unthreaded hole;
    a threaded bolt rotatably extending through the unthreaded hole in the bottom member of the second yoke and engageably extending through the threaded hole in the bottom member of the first yoke, the threaded bolt engaging with threads in the threaded hole in the first yoke and coupling the second U-shaped yoke to the first U-shaped yoke;
    a first fitment for coupling to a chain, the first fitment pivotably coupled to the first U-shaped yoke with a first clevis pin extending through the holes in the arms of the first U-shaped yoke; and
    a second fitment pivotably coupled to the second U-shaped yoke with a second clevis pin;
    a rotation limiter with a limiter leg, the limiter being secured to one of or between the parallel arms of the first U-shaped yoke at the open end, the leg extending to limit rotation of the first fitment relative to the first U-shaped yoke;

a drive assembly comprising a ratchet wrench type socket releasably coupleable with a head of the threaded bolt, a universal type joint coupled to the ratchet wrench type socket and an extension bar extending from the universal type joint;

wherein actuating the extension bar of the drive assembly rotates the threaded bolt, which moves the first U-shaped yoke relative to the second U-shaped yoke.

2. The tensioning device of claim 1, wherein the first fitment is a first hook for hooking a chain, the first hook pivotably coupled to the first U-shaped yoke with the first clevis pin extending through the holes in the arms of the first U-shaped yoke; and the second fitment is a second hook pivotably coupled to the second U-shaped yoke.

3. The tensioning device of claim 2, further comprising a swivel assembly pivotably coupled to the second U-shaped yoke with the second clevis pin extending through the holes in the arms of the second U-shaped yoke; the second hook being pivotably coupled to the swivel assembly with a third clevis pin.

4. The tensioning device of claim 3, wherein the swivel assembly comprises: a swivel yoke having a pair of short arms connected by a bottom member at one end, with holes in the arms at an opposed end to couple the swivel yoke to the second U-shaped yoke with the second clevis pin, the bottom member of the swivel yoke having a hole in a center of the bottom member extending therethrough;

a swivel fixture having one end with a drilled hole in a center to receive the third clevis pin therethrough and is configured to allow the second hook to pivot around the third clevis pin, and the swivel fixture further having a cylindrical threaded member extending from the one end, the cylindrical threaded member being dimensioned to pass through the hole in the bottom member of the swivel yoke; and a swivel nut positioned between the short arms of the swivel yoke;

wherein the cylindrical threaded member of the swivel fixture extends through the bottom member of the swivel yoke, engages the swivel nut positioned between the short arms of the swivel yoke, and allows the swivel fixture and the second hook to rotate within the swivel yoke.

5. The tensioning device of claim 1, wherein the extension bar is a ratchet wrench type extension bar, and the universal type joint is a gimbal or wobble type joint.

6. The tensioning device of claim 5, further comprising an external power driver, a ratchet handle or crank operatively coupled to the extension bar, and wherein the external power driver, the ratchet handle or crank are being configured to transfer a rotational force through the drive assembly, which rotates the threaded bolt to which it is engaged.

7. The tensioning device of claim 6, wherein the extension bar has a length such that the external power driver, the ratchet handle or crank are positioned at a distance from the head of the fully threaded bolt.

8. The tensioning device of claim 7, wherein the drive assembly comprises a socket that is compatible with the head of the threaded bolt, the socket being releasably engageable between the head of the threaded bolt and the universal type joint.

9. The tensioning device of claim 7, wherein the threaded bolt has a socket head that is compatible with the wobble type joint or the universal type joint.

10. The tensioning device of claim 2, wherein the limiter is secured to or integral with the end of one of the arms of the first U-shaped yoke, the limiter leg being directed from the one of the arms of the first U-shaped yoke towards the center line of the first U-shaped yoke, extending from the one of the arms of the first U-shaped yoke and past a portion of the first hook, the limiter leg thereby restricting rotation of the first hook around the first clevis pin in one direction.

11. The tensioning device of claim 10, further comprising a second rotation limiter secured on or integral with the end of one of the arms of the first U-shaped yoke, to further restrict rotation in a second direction around the first clevis pin.

12. The tensioning device of claim 1, further comprising a threaded washer or nut secured between the arms of the first U-shaped yoke, and against the bottom member of the first U-shaped yoke through which the threaded bolt is engaged.

13. The tensioning device of claim 4, further comprising a rectangular washer secured between the arms of the first, second or swivel yoke on the bottom member of the first, second or swivel yoke.

14. The tensioning device of claim 3, wherein the first and/or second fitments are engageable with cables, nets, straps or anchor points, and are pivotably coupled to the first U-shaped yoke, the second U-shaped yoke and/or the swivel assembly with clevis pins.

15. The tensioning device of claim 5, wherein the universal type joint is the gimbal type joint and the tensioning device further comprises:

a socket head bolt that is releasably coupleable with the gimbal type joint, and a compressible, resilient disk that is mounted securely on a neck of the gimbal type joint between a body of the gimbal type joint that is coupled with the extension bar, and a protruding member of the universal joint which engages with the socket head bolt.

* * * * *